(12) United States Patent
Ruan et al.

(10) Patent No.: US 11,590,857 B2
(45) Date of Patent: Feb. 28, 2023

(54) CHARGING METHOD, APPARATUS, DEVICE, MEDIUM, BATTERY MANAGEMENT SYSTEM AND CHARGING PILE

(71) Applicant: Contemporary Amperex Technology Co., Limited, Ningde (CN)

(72) Inventors: Jian Ruan, Ningde (CN); Shichao Li, Ningde (CN); Yanhua Lu, Ningde (CN); Yizhen Hou, Ningde (CN); Wei Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 246 days.

(21) Appl. No.: 17/042,965

(22) PCT Filed: Nov. 29, 2019

(86) PCT No.: PCT/CN2019/122151
§ 371 (c)(1),
(2) Date: Sep. 29, 2020

(87) PCT Pub. No.: WO2020/108639
PCT Pub. Date: Jun. 4, 2020

(65) Prior Publication Data
US 2021/0146794 A1    May 20, 2021

(30) Foreign Application Priority Data
Nov. 30, 2018    (CN) .......................... 201811454861.1

(51) Int. Cl.
*H02J 7/00*    (2006.01)
*H02J 7/14*    (2006.01)
(Continued)

(52) U.S. Cl.
CPC ............. *B60L 53/62* (2019.02); *B60L 53/665* (2019.02); *B60L 58/12* (2019.02); *B60L 58/16* (2019.02);
(Continued)

(58) Field of Classification Search
CPC ........ B60L 53/62; B60L 53/665; B60L 58/12; B60L 58/16; B60L 2240/545; H02J 7/007194; H02J 7/0048; H02J 7/005
(Continued)

(56) References Cited

U.S. PATENT DOCUMENTS 6,281,663 B1    8/2001    Yagi et al.
8,610,401 B2   12/2013   Kim et al.
(Continued)

FOREIGN PATENT DOCUMENTS

| CN | 103715725 A | 4/2014 |
| CN | 103915869 A | 7/2014 |

(Continued)

OTHER PUBLICATIONS

The First Office Action for China Application No. 201811454861.1, dated Feb. 1, 2021, 13 pages.
(Continued)

*Primary Examiner* — Alexis B Pacheco
(74) *Attorney, Agent, or Firm* — East IP P.C.

(57) ABSTRACT

The present application discloses a charging method, an apparatus, a device, a medium, a battery management system and a charging pile. The method includes: acquiring a charging demand parameter set by a user; calculating, according to the charging demand parameter and acquired actual operation state information of a battery, a target charging scheme for charging the battery; transmitting, according to the target charging scheme, a first charging request to a charging device, so that the charging device
(Continued)

charges the battery according to the first charging request. According to the charging method, the apparatus, the device, medium, the battery management system and the charging pile provided in the embodiments of the present application, personalized smart charging can be achieved for different users.

18 Claims, 3 Drawing Sheets

(51) Int. Cl.
  *B60L 53/62* (2019.01)
  *B60L 58/12* (2019.01)
  *B60L 58/16* (2019.01)
  *B60L 53/66* (2019.01)

(52) U.S. Cl.
  CPC ............ *H02J 7/005* (2020.01); *H02J 7/0048* (2020.01); *H02J 7/007194* (2020.01); *B60L 2240/545* (2013.01)

(58) Field of Classification Search
  USPC .................................................. 320/104, 107
  See application file for complete search history.

(56) References Cited

U.S. PATENT DOCUMENTS

| | | | |
|---|---|---|---|
| 9,128,510 | B2 | 9/2015 | Federico et al. |
| 9,346,365 | B1* | 5/2016 | Penilla ................. H04W 4/024 |
| 2013/0127417 | A1* | 5/2013 | Karner ................... B60L 53/12 |
| | | | 320/109 |
| 2015/0032661 | A1* | 1/2015 | Manfield ................ B60L 50/62 |
| | | | 705/347 |
| 2015/0298567 | A1* | 10/2015 | Uyeki ..................... B60L 58/13 |
| | | | 320/155 |
| 2016/0275400 | A1* | 9/2016 | Hodges ............... H02J 7/00047 |
| 2017/0043674 | A1* | 2/2017 | DeBoer, III ............ B60L 53/63 |
| 2017/0088001 | A1* | 3/2017 | Haas ....................... B60L 53/68 |
| 2018/0131204 | A1* | 5/2018 | Weicker .............. H02J 7/00308 |
| 2018/0178672 | A1* | 6/2018 | Ichikawa .............. B60L 53/305 |
| 2019/0202304 | A1* | 7/2019 | Moghe .................... B60L 53/12 |
| 2020/0156492 | A1* | 5/2020 | Mackenzie ............. B60L 53/65 |
| 2020/0164759 | A1* | 5/2020 | Heuer ..................... B60L 53/65 |
| 2021/0380012 | A1* | 12/2021 | Tsuda ...................... B60L 53/66 |

FOREIGN PATENT DOCUMENTS

| | | |
|---|---|---|
| CN | 102837697 B | 10/2015 |
| CN | 105305577 A | 2/2016 |
| CN | 106114251 A | 11/2016 |
| CN | 106159360 A | 11/2016 |
| CN | 106183846 A | 12/2016 |
| CN | 106427650 A | 2/2017 |
| CN | 107128204 A | 9/2017 |
| CN | 108116251 A | 6/2018 |
| CN | 108202608 A | 6/2018 |
| CN | 108496289 A | 9/2018 |
| EP | 2721712 A1 | 4/2014 |

OTHER PUBLICATIONS

The Second Office Action for China Application No. 201811454861.1, dated Aug. 2, 2021, 11 pages.

The International search report for PCT Application No. PCT/CN2019/122151, dated Feb. 24, 2020, 11 pages.

The extended European search report for EP Application No. 19891484.8, dated May 25, 2021, 7 pages.

* cited by examiner

CHARGING METHOD, APPARATUS, DEVICE, MEDIUM, BATTERY MANAGEMENT SYSTEM AND CHARGING PILE

CROSS-REFERENCE TO RELATED APPLICATIONS

This application is a National Stage of International Application No. PCT/CN2019/122151, filed on Nov. 29, 2019, which claims priority to Chinese Patent Application No. 201811454861.1, filed on Nov. 30, 2018, both of which are hereby incorporated by reference in their entireties.

TECHNICAL FIELD

The application relates to the field of new energy, in particular, to a battery charging method, an apparatus, a device, a medium, a battery management system and a charging pile.

BACKGROUND

Nowadays, with the gradual consumption of non-renewable energy such as oil and the urgent demand for environmental protection, the development of the new energy industry has attracted much attention. Battery is one of the key and core technologies in the new energy industry. In recent years, new energy vehicles using rechargeable batteries as the power source have been developed very fast, which have a gradually expanding proportion in the world's vehicles and are widely used in large and medium-sized cities. They are also an important part of the development of electric vehicle industry and the realization of advanced manufacturing industry.

In the current electric vehicles, mostly, charging batteries are charged by using charging piles. However, with the development of the industry of the electric vehicles, users have higher demands for the intelligence of the electric vehicle. For example, when a user connects a charging device to the electric vehicle for charging, the user wants to know information regarding: how long it takes to fully charge the vehicle, how long it takes to charge the vehicle to a target electricity amount, how much electricity the vehicle can be charged in a limited charging time, and a distance the vehicle can travel when it is charged to the target electricity amount, and the like.

As the user is always a passive receiver during the process of the service, he/she cannot realize personalized smart charging according to his/her own demands, for example, information such as a charging time at his/her disposal or mileage. In order to help the user to arrange his/her time reasonably, the realization of personalized smart charging is an urgent problem.

SUMMARY

The embodiments of the present application provide a battery charging method, an apparatus, a device, a medium, a battery management system and a charging pile, which can implement personalized smart charging for different users.

According to one aspect of the embodiments of the present application, a battery charging method is provided, where the method includes:

acquiring a charging demand parameter set by a user;

calculating, according to the charging demand parameter and acquired actual operation state information of a battery, a target charging scheme for charging the battery;

transmitting, according to the target charging scheme, a first charging request to a charging device, so that the charging device charges the battery according to the first charging request.

According to another aspect of the embodiments of the present application, a battery charging apparatus is provided, where the battery charging apparatus includes:

an acquiring module, configured to acquire a charging demand parameter set by a user;

a calculating module, configured to calculate, according to the charging demand parameter and acquired actual operation state information of a battery, a target charging scheme for charging the battery;

a charging module, configured to transmit, according to the target charging scheme, a first charging request to a charging device, so that the charging device charges the battery according to the first charging request.

According to yet another aspect of the embodiments of the present application, a battery management system is provided, where the system includes the battery charging apparatus as provided by the embodiments of the present application.

According to yet another aspect of the embodiments of the present application, a charging pile is provided, where the charging pile includes the battery charging apparatus as provided by the embodiments of the present application.

According to yet another aspect of the embodiments of the present application, a battery charging device is provided, where the device includes: a processor and a memory having a computer program instruction stored thereon, where:

the processor, when executing the computer program instruction, implements the battery charging method as provided by the embodiments of the present application.

According to yet another aspect of the embodiments of the present application, a computer storage medium is provided, where the computer storage medium has a computer program instruction stored thereon, where, the computer program instruction, when being executed by a processor, implements the battery charging method as provided by the embodiments of the present application.

According to the battery charging method, the apparatus, the device, the medium, the battery management system and the charging pile provided by the embodiments of the present application, the target charging scheme for charging the battery is calculated according to the acquired charging demand parameter which is set by the user and the actual operation state information of the battery, and then the charging request is transmitted to the charging device according to the target charging scheme for charging the battery, where, by setting the target charging scheme according to the charging demand parameter set by the user, the personalized smart charging is realized for different users.

BRIEF DESCRIPTION OF THE DRAWINGS

Features, advantages, and technical advantages of the exemplary embodiments of the present application will be described below with reference to the drawings.

DESCRIPTION OF EXAMPLE CONFIGURATIONS

Implementations of the present application are described in further detail below with reference to the drawings and embodiments. The detailed description and drawings of the following embodiments are used to exemplarily illustrate the principle of the present application, but they cannot be used to limit the scope of the present application, that is, the present application is not limited to the described embodiments.

It is to be noted that relational terms such as first, second, and the like are used herein solely to distinguish one entity or operation from another entity or operation without necessarily requiring or implying any actual such relationship or order between such entities or operations. Moreover, the terms "include", "including", or any other variation thereof, are intended to cover a non-exclusive inclusion, such that a process, method, article or device that includes a series of elements does not include only those elements but may include other elements not explicitly listed or inherent to such process, method, article or device. An element preceded by "include . . . " does not, without more constraints, preclude the existence of additional identical elements in the process, method, article or device that includes the element.

For a better understanding of the present application, a battery charging method, an apparatus, a device, a medium, a battery management system and a charging pile according to embodiments of the present application will be described in detail with reference to the drawings. It is to be noted that these embodiments are not intended to limit the scope disclosed by the present application.

Figure 1:
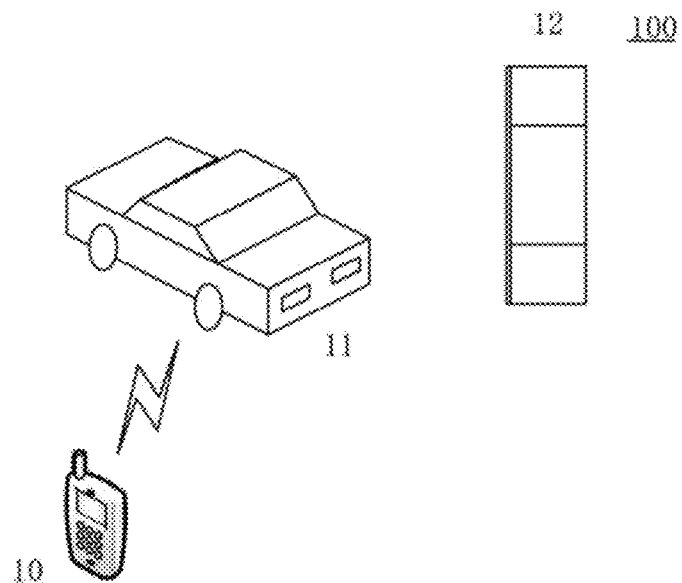
FIG. 1 shows a schematic architectural diagram of a battery charging system according to some embodiments of the present application.

FIG. 1 shows a schematic architectural diagram of a battery charging system 100 according to some embodiments of the present application. As shown in FIG. 1, the battery charging system includes a terminal 10 of a user, a vehicle 11 installed with a battery to be charged, and a charging pile 12. When the user wants to charge the vehicle 11, the user inputs a charging demand parameter through the terminal 10. The terminal 10 transmits the charging demand parameter set by the user to the vehicle 11. The battery management system in the vehicle 11 receives the charging demand parameter, and calculates a target charging scheme for charging the battery according to the charging demand parameter and acquired actual operation state information of the battery. After the target charging scheme is calculated by the battery management system, a charging request is transmitted to the charging device 12 according to the target charging scheme, so that the charging device charges the battery of the vehicle 11 according to the target charging scheme. The charging device and the vehicle may be connected through a charging gun (not shown in FIG. 1).

According to the battery charging system provided in the embodiment of the present application, the charging demand parameter set by the user is utilized to determine the target charging scheme that is actually used for charging the battery, thereby realizing personalized charging according to the demands of the user.

Figure 2:
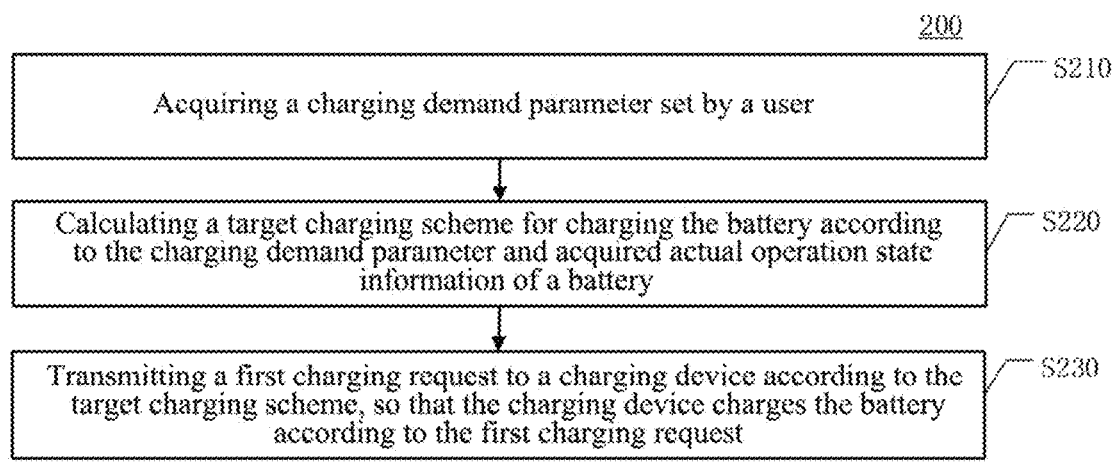
FIG. 2 shows a schematic flowchart of a battery charging method according to some embodiments of the present application.

FIG. 2 shows a flowchart of a battery charging method applied to a battery management system side according to some embodiments of the present application. As shown in FIG. 2, the battery charging method 200 applied to the battery management system side in the embodiment of the present application includes the following steps:

S210: acquiring a charging demand parameter set by a user.

Figure 3:
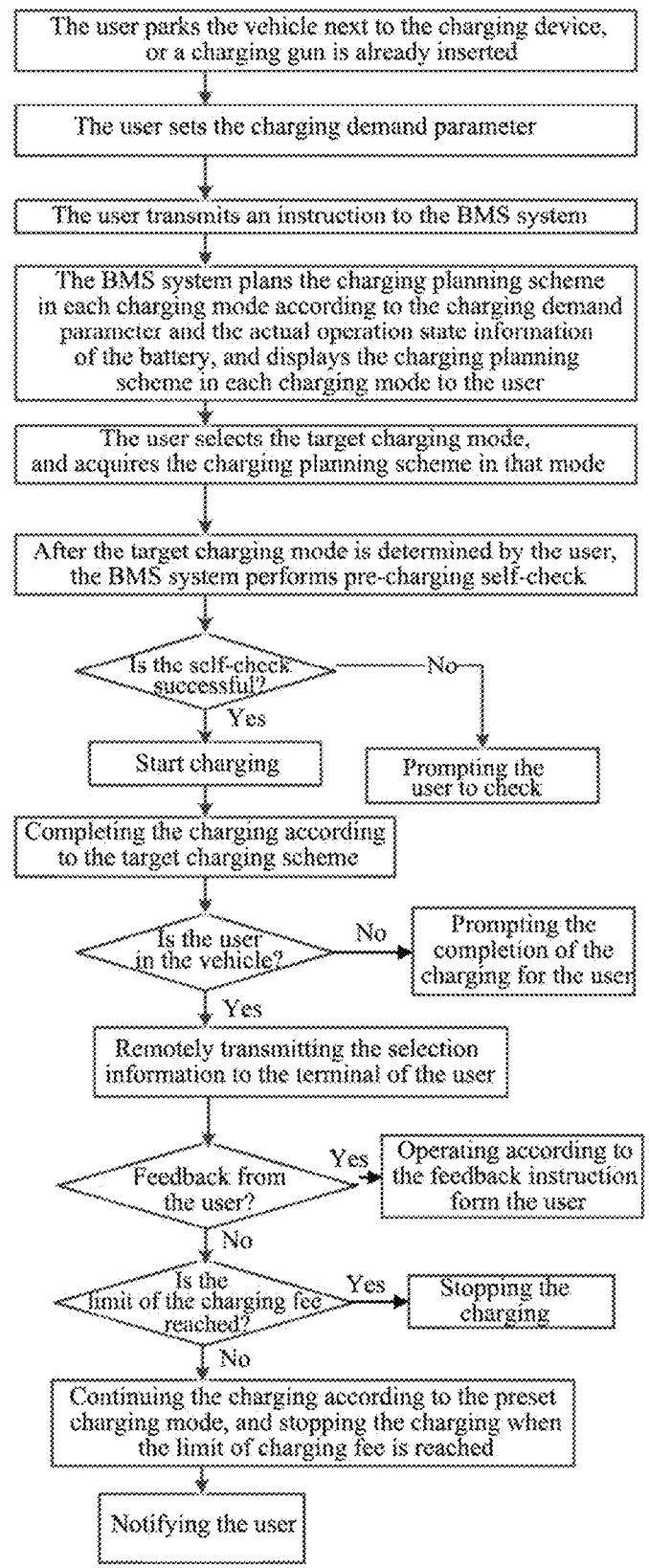
FIG. 3 shows a schematic flowchart of a battery charging method according to some other embodiments of the present application.

As shown in FIG. 3, the user first parks the electric vehicle next to the charging device, where the charging gun may or may not be inserted into the charging device. The user may set one or more charging demand parameters through a charging demand parameter setting interface. The charging demand parameter setting interface may be on a display in the vehicle, in a mobile phone application (APP) or on an additional control panel in the vehicle.

The charging demand parameter is a charging parameter associated with the charging demands of the user. As an example, the charging demand parameter includes at least one of the following parameters: a charging time at the user's disposal, mileage required by the user, a state of charge (SOC) of the battery required by the user, a charging fee at the user's disposal, a type of charging mode, a charging price.

It should be noted that, the charging demand parameter setting interface may display multiple charging demand parameters for the user to set, but the user may set one or more input values of the charging demand parameters according to his/her own demands. That is, the charging demand parameter set by the user includes the type of charging demand parameter selected by the user and the user input value corresponding to that charging demand parameter.

In some embodiments of the present application, if the charging prices of charging devices from different brands and companies are not significantly different, that is, the cost per kilowatt-hour is not significantly different, a charging price may be set in advance in the battery management system to facilitate the calculation of the target charging scheme.

S220: calculating a target charging scheme for charging the battery according to the charging demand parameter and acquired actual operation state information of a battery.

As an example, still referring to FIG. 3, after the user sets the charging demand parameter through the terminal according to his/her actual situation, the terminal transmits an instruction of the scheme planning and the charging demand parameter to the battery management system (BMS). The BMS plans the target charging scheme for charging the battery according to the actual operation state information of the battery and the charging demand parameter set by the user.

The target charging scheme includes at least one of the following considerations: a charging waiting time for the user, increasable endurance mileage of the battery, an SOC of the battery that can be increased, a charging fee to be paid by the user.

The charging waiting time is a charging time required for the battery to reach a certain SOC from the current SOC, which may also be referred to as the remaining charging time.

As an example, the actual operation state information of the battery includes: a current temperature of the battery, a current SOC of the battery, and a capacity of the battery. Therefore, the charging waiting time may be calculated according to the increasable SOC of the battery, the current temperature of the battery, the current SOC of the battery, a preset corresponding relationship between a charging demand current with the temperature and the SOC, and an acquired charging temperature rising rate of the battery.

Specifically, first, a charging current value of the battery is determined according to the current temperature of the battery, the current SOC of the battery, and the preset corresponding relationship between the charging demand current with the temperature and the SOC.

Then, the charging temperature rising rate of the battery is determined according to the current SOC of the battery, the current temperature of the battery and the corresponding relationship between the temperature changing rate, the temperature, and the SOC.

Next, a search is made for a changing path of the SOC and the battery temperature during the charging process according to the charging current and the charging temperature rising rate. A temperature at the next moment is calculated according to the charging temperature rising rate of the battery, and a current value at the next moment is calculated according to a current output. The time during which the temperature and the current change is accumulated until the target SOC is obtained by calculation. The accumulated time is outputted as the charging waiting time. The target SOC is a sum of the current SOC of the battery and the increasable SOC of the battery.

In some embodiments of the present application, the charging current value of the battery may be corrected by using an actual current which is outputted by the charging device. At the beginning of the charging, the calculation is performed according to the charging request current of the BMS. During the charging process, the actual charging current during a period of time is extracted, a future charging current of the BMS is corrected according to a proportional relationship between the actual output current of the charging device and the charging request current, and the remaining charging time is estimated using that coefficient.

In some embodiments of the present application, the actual operation state information of the battery further includes at least one of the following information: a current state of health (SOH) of the battery, a current voltage of the battery, internal resistance of the battery, working information of a heating system of the battery, working information of a cooling system of the battery, mileage of the battery when fully charged.

In some embodiments of the present application, according to the working information of the internal heating system of the battery, the working information of the cooling system of the battery, and the energy conservation law, the charging temperature rising rate of the battery may be estimated to calculate the remaining charging time.

In some embodiments of the present application, the collected current and the current voltage of the battery may also be used to estimate the current SOC of the battery, and then the current SOC is converted to an open circuit voltage to calculate the remaining charging time.

In some embodiments of the present application, the capacity of the battery may be corrected using the internal resistance and the current state of health (SOH) of the battery, so as to correct the charging waiting time.

In the embodiment of the present application, the increasable endurance mileage of the battery may be calculated according to the increasable SOC of the battery. Specifically, the corresponding endurance mileage by consuming the increasable SOC of the battery is estimated according to the mileage of the battery when fully charged. Since the consumption of power is different at high and low battery levels, the mileage may be corrected through a weighting factor. The weighting factor is determined by fitting mileage corresponding to the SOC consumption in different intervals.

Therefore, if the target charging scheme includes the increasable endurance mileage of the battery, the actual operation state information of the battery may also include the corresponding mileage when the battery is fully charged.

In the embodiment of the present application, the charging fee to be paid the user may be calculated according to the increasable SOC of the battery and the price corresponding to the charging device.

Since the actual operation state information of the battery is information required for calculating the target charging scheme, before step S220, the battery charging method further includes the following step:

S211: determining that the actual operation state information of the battery can be acquired.

In the embodiment of the present application, if the actual operation state information of the battery cannot be acquired, the user is prompted to perform checking.

As an example, the current temperature of the battery is important actual operation state information, if the temperature information of the battery cannot be acquired, the user is prompted to check whether the temperature collection of the battery has failed.

If it is determined that the current temperature of the battery can be acquired, then it should be further determined whether the current temperature of the battery is within a preset temperature range. If the current temperature of the battery is not within the preset temperature range, the charging request is not transmitted to the charging device and the user is prompted to perform checking.

In the embodiment of the present application, if the user sets a plurality of charging demand parameters, since the user cannot determine whether the plurality of charging demand parameters can be satisfied with each other, the battery management system would calculate an optimal target charging scheme that can satisfy the demands of the user according to the charging demand parameters set by the user.

In the embodiment of the present application, S220 includes the following steps:

S2201: if the charging demand parameters do not include a charging demand parameter associated with a charge capacity of the battery, calculating the target charging scheme based on a preset charging threshold and the actual operation state information.

As an example, if the user only sets a charging mode that is irrelevant to the charge capacity, the battery management system would plan the increasable SOC of the battery as the SOC corresponding to the preset charging threshold.

Then, the charging waiting time is calculated according to the target SOC corresponding to the charging threshold and the actual operation state information of the battery, of which the calculation manner will not be repeated here.

Finally, the charging fee to be paid by the user is calculated according to the charging threshold, and the increasable endurance mileage of the battery corresponding to the charging threshold may be calculated according to the mileage of the battery when fully charged.

S2202: if the charging demand parameters include only one charging demand parameter associated with the charge capacity of the battery, calculating the target charging scheme based on the one charging demand parameter associated with the charge capacity and the actual operation state information.

In the embodiment of the present application, if the only one charging demand parameter associated with the charge capacity of the battery is not the charging time at the user's disposal, the increasable SOC for the user is first determined according to the only one charging demand parameter associated with the charge capacity of the battery.

Then, information, such as the charging waiting time, the increasable endurance mileage of the battery and the charging fee to be paid by the user, is calculated according to the increasable SOC of the battery and the actual operation state information of the battery.

If the only one charging demand parameter associated with the charge capacity of the battery is the charging time at the user's disposal, the charging time at the user's disposal is taken as the charging waiting time for the user. Then the increasable SOC of the battery is determined according to the current temperature of the battery, the current SOC of the battery, the preset corresponding relationship between a charging demand current with the temperature and the SOC, and the acquired charging temperature rising rate of the battery.

Then information such as the increasable endurance mileage of the battery and the charging fee to be paid by the user is calculated according to the increasable SOC of the battery.

S2203: if the charging demand parameters include a plurality of candidate parameters associated with the charge capacity of the battery, selecting any one candidate parameter of the plurality of candidate parameters as the current parameter.

As an example, if the user sets three candidate parameters associated with the charge capacity of the battery, including: a charging time at the user's disposal t, mileage required by the user s, and a state of charge of the battery required by the user m. A user input value of t is 30 minutes (min), a user input value of s is 50 kilometers (km), and a user input value of m is 90%. As a specific example, t is selected as the current parameter from s, t and m.

S2204: calculating a calculation value of each of other parameters under a condition of the current parameter according to the current parameter and the actual operation state information, where the other parameters are parameters other than the current parameter of the plurality of candidate parameters.

As an example, the calculation value of m and the calculation value of s under a condition of 30 min may be calculated according to the user input value of t which is 30 min and the actual operation state information of the battery.

S2205: if, for any other parameter of all the other parameters, the calculation value of the other parameter is less than or equal to user input value corresponding to the other parameter, taking the current parameter as a target charging demand parameter;

if there is only one target other parameter among all the other parameters, taking the target other parameter as the target charging demand parameter, where a calculation value of the target other parameter is greater than a user input value corresponding to the target other parameter;

if there are a plurality of target other parameters among all of the other parameters, updating the current parameter with any one of the plurality of target other parameters, until the target charging demand parameter is selected from the plurality of candidate parameters.

In the above example, if, under the condition of 30 min, the calculation value of m is 80% and the calculation value of s is 45 km, it represents that the charging time at the user's disposal, which is 30 min, is the parameter that would be first reached, that is, t is taken as the target charging demand parameter.

if, under the condition of 30 min, the calculation value of m is 80% and the calculation value of s is 60 km, then the target other parameter is s, that is, s is taken as the target charging demand parameter.

if, under the condition of 30 min, the calculation value of m is 100% and the calculation value of s is 60 km, then the target other parameters include m and s. Then, the current parameter is updated with any one parameter selected from s and m, and then the process proceeds to step S2204, until the target charging demand parameter is determined.

In some embodiments of the present application, if the charging demand parameters set by the user include the state of charge of the battery required by the user, the SOC required by the user and the actual operation state information of the battery may first be used to calculate the remaining charging time. If any one parameter of the charging waiting time for the user, the increasable endurance mileage of the battery and the charging fee to be paid by the user has reached the input value set by the user before the SOC required by the user is calculated to be reached, then the charging demand parameter that has reached the user input value is taken as the target charging demand parameter. The user input value is a numerical value that is set by the user for the charging demand parameter.

S2206: calculating the target charging scheme based on the target charging demand parameter and the actual operation state information.

As an example, the target charging demand parameter is the charging time at the user's disposal which is 30 min, then the increasable SOC of the battery in the target charging scheme is calculated according to the charging time at the user's disposal (30 min) and the actual operation state information of the battery. Finally, the increasable endurance mileage of the battery and the charging fee to be paid by the user are calculated according to the increasable SOC of the battery.

In the embodiment of the present application, the target charging demand parameter is selected from the charging demand parameters set by the user, thus, the optimal charging scheme that satisfies many aspects of the user's demands can be calculated, which improves the user experience.

In the embodiment of the present application, since information such as the charging current and the temperature changing rate of the battery is different in different charging modes, the charging planning schemes obtained in different charging modes are different according to the same charging demand parameter and the actual operation state information of the battery.

In some embodiments of the present application, if the user knows well about the charging modes, then the user may preset the type of charging mode. Then the battery management system takes the type of charging mode set by the user as the target charging mode, calculates the charging planning scheme in the target charging mode according to the charging demand parameter set by the user and the actual operation state information of the battery, and takes the charging planning scheme in the target charging mode as the target charging scheme.

According to the battery charging method provided by the embodiment, the target charging scheme is calculated using the charging mode set by the user, which not only satisfies the charging demands of the user, but also reduces the calculation time and improves the charging speed.

In some embodiments of the present application, still referring to FIG. 3, if the user does not set the type of charging mode, a charging planning scheme in each charging mode of the preset plurality of charging modes is calculated respectively according to the charging demand parameter and the actual operation state information. As an example, the preset plurality of charging modes include a fast charging mode, a slow charging mode, and a healthy charging mode.

In the embodiment of the present application, if the charging demand parameters set by the user do not include a parameter associated with the charge capacity of the battery, then the charging planning scheme in each charging mode is calculated based on a manner similar to step S2201.

If the charging demand parameters set by the user include only one parameter associated with the charge capacity of the battery, then the charging planning scheme in each charging mode is calculated based on a method similar to step S2202.

If the charging demand parameters set by the user include a plurality of candidate parameters associated with the charge capacity of the battery, then the target charging demand parameter in each charging mode is selected based on the manner according to step S2203 to step S2205. Finally, the charging planning scheme in each charging mode is calculated based on the target charging demand parameter in each charging mode and the actual operation state information of the battery.

Still referring to FIG. 3, after the charging planning scheme in each charging mode is acquired, the charging planning scheme in each charging mode is transmitted to the terminal of the user. The terminal of the user displays the charging planning scheme in each charging mode to the user. The user selects the target charging mode from the plurality of charging modes according to the charging planning scheme in each charging mode.

After the target charging mode is determined by the user, an instruction is transmitted to the battery management system. The battery management system takes the acquired charging planning scheme in the target charging mode as the target charging scheme.

If the user has not selected the charging mode during a preset period of time, a charging planning scheme in a preset charging mode of the plurality of charging modes is taken as the target charging scheme. As an example, the preset period of time is 30 s, and the preset charging mode is the healthy charging mode.

According to the battery charging method provided by the embodiment of the present application, the charging planning schemes in the plurality of charging modes are calculated, so that the user can select the charging mode as desire according to the more intuitive information in the charging planning scheme, which further satisfies the charging demands of the user and facilitates the user's operation.

Still referring to FIG. 3, in some embodiments of the present application, after the planning information for the charging usage parameters is determined and before the planning information is used for charging the battery, according to the battery charging method, it is required to perform self-check on the battery management system. Specifically, before the charging of the battery, the battery charging method further includes:

S221: determining that the charging device is connected to the battery.

As shown FIG. 3, if the charging device is not connected to the vehicle installed with the battery, then the user is prompted to connect the charging device to the vehicle. If it is determined that the charging device is already connected to the vehicle installed with battery, then the user it prompted to perform charging based on the target charging scheme, that is, the method proceeds to S230.

S230: transmitting a first charging request to a charging device according to the target charging scheme, so that the charging device charges the battery according to the first charging request.

In the embodiment of the present application, after the target charging scheme is determined, the charging request is continuously transmitted to the charging device according to the target charging scheme, so as to implement the charging of the battery by the charging device.

According to the battery charging method provided by the embodiment of the present application, the smart charging of the battery according to the user's demands is realized, which facilitates the user to arrange his/her time reasonably and provides good user experience.

In some embodiments of the present application, in order to further accommodate the user's demands, the battery charging method further includes:

S240: determining that the charging of the battery is completed according to the target charging scheme.

In the embodiment of the present application, during the process of transmitting the charging request to the charging device, it is determined whether the charging of the battery is completed according to the target charging scheme. Referring FIG. 3, if the charging of the battery is completed, then it is determined whether the user is in the vehicle installed with the battery. If the user is in the vehicle, then the transmitting the charging request to the charging device is stopped, and feedback information of charging completion is transmitted to the user to prompt the completion of the charging for the user. If the user is not in the vehicle, then the method proceeds to S250.

S250: determining that the user is not in vehicle installed with the battery, and transmitting, to the terminal of the user, selection information for instructing the user to select to re-develop a charging scheme or to stop transmitting a charging request to the charging device, so that the user gives a feedback instruction according to the selection information.

Still referring to FIG. 3, if the charging task has been completed within the time specified by the user, but the user has not returned to the vehicle, selection information is remotely transmitted to the user via a text message or an APP to prompt the user either to re-develop the plan or stop the action such as transmitting the charging request to the charging device.

S260: if the feedback instruction is received, re-developing a charging scheme or stopping transmitting the charging request to the charging device.

In the embodiment of the present application, if the user feeds back that the current charging scheme is to be continued, then the target electricity amount in the original scheme is changed to 100%, and then the charging is performed according to the preset healthy charging mode.

If the user feeds back that a new scheme is to be performed, then the user is required to prompt the redevelopment of the charging plan via a text message, an APP or other remote interaction manners.

If the user feeds back that the transmitting the charging request to the charging device is to be stopped, then the transmitting the charging request to the charging device is stopped, that is, the charging is stopped.

According to the battery charging method provided by the embodiment of the present application, the feedback instruction from the user is received, which can further enable the user to plan his/her own time reasonably.

S270: if the feedback instruction is not received, determining that the charging demand parameter includes a first charging fee at the user's disposal, that is, the limit of the charging fee, and determining whether a second charging fee to be paid by the user reaches the first charging fee;

if the second charging fee does not reach the first charging fee, transmitting a second charging request to the charging device based on a charging planning scheme in a preset charging mode of the plurality of charging modes, so that the charging device charges the battery according to the second charging request; and if the second charging fee reaches the first charging fee, stopping transmitting the second charging request to the charging device and notifying the user.

The preset charging mode may be the healthy charging mode in the plurality of charging modes.

If the charging demand parameters set by the user do not include the first charging fee at the user's disposal, then the transmitting the charging request to the user is stopped, that is, the charging is suspended to wait for an instruction from the user. When the user disconnects the charging device from the electric vehicle, the charging is stopped.

According to the battery charging method provided by the embodiment of the present application, not only the charging can be performed according to the user's demands, but also the charging information can be fed back to the user in real-time, so that the user can further change the charging scheme, which is more convenient for the user. In addition, the information interaction between the battery charging system and the charging device is reduced, which ensures the security of the data of the battery in the vehicle and the user data.

Figure 4:
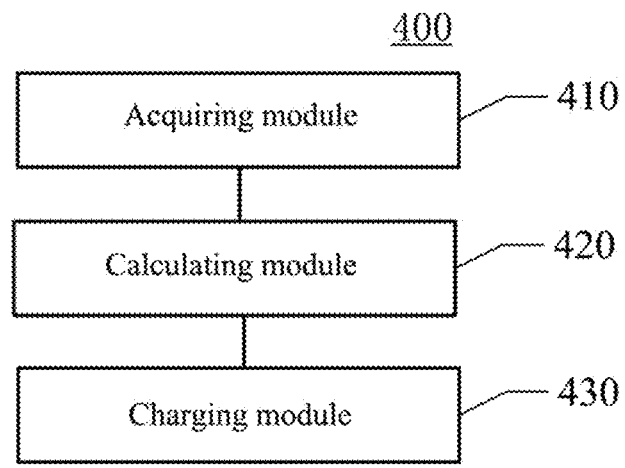
FIG. 4 shows a schematic structural diagram of a battery charging apparatus according to some embodiments of the present application.

FIG. 4 shows a schematic structural diagram of a battery charging apparatus provided according to some embodiments of the present application. As shown in FIG. 4, a battery charging apparatus 400 includes:

an acquiring module 410, configured to acquire a charging demand parameter set by a user;

a calculating module 420, configured to calculate, according to the charging demand parameter and acquired actual operation state information of a battery, a target charging scheme for charging the battery; and a charging module 430, configured to transmit, according to the target charging scheme, a first charging request to a charging device, so that the charging device charges the battery according to the first charging request.

In the embodiment of the present application, the calculating module 420 is specifically configured to:

calculate a charging planning scheme in each charging mode of a plurality of charging modes respectively according to the charging demand parameter and the actual operation state information;

transmit the charging planning scheme in each charging mode to a terminal of the user, so that the user selects a target charging mode from the plurality of charging modes according to the charging planning scheme in each charging mode;

take a charging planning scheme in the target charging mode as the target charging scheme.

In the embodiment of the present application, the calculating module 420 is further specifically configured to:

acquire a type of charging mode set by the user, and take a charging mode of the set type as a target charging mode;

calculate a charging planning scheme in the target charging mode according to the charging demand parameters and the actual operation state information, and take the charging planning scheme in the target charging mode as the target charging scheme.

In the embodiment of the present application, the calculating module 420 is further specifically configured to:

if the charging demand parameters do not include a charging demand parameter associated with a charge capacity of the battery, calculate the target charging scheme based on a preset charging threshold and the actual operation state information;

if the charging demand parameters include only one charging demand parameter associated with the charge capacity of the battery, calculate the target charging scheme based on the one charging demand parameter associated with the charge capacity and the actual operation state information.

In the embodiment of the present application, the calculating module 420 is further specifically configured to:

if the charging demand parameters include a plurality of candidate parameters associated with the charge capacity of the battery, select any one candidate parameter of the plurality of candidate parameters as a current parameter;

calculate a calculation value of each of other parameters with the current parameter being a condition according to the current parameter and the actual operation state information, where the other parameters are parameters other than the current parameter of the plurality of candidate parameters;

if, for any other parameter of all the other parameters, the calculation value of the other parameter is less than or equal to user input value corresponding to the other parameter, take the current parameter as a target charging demand parameter;

if there is only one target other parameter among all of the other parameters, take the target other parameter as the target charging demand parameter, where a calculation value of the target other parameter is greater than a user input value corresponding to the target other parameter;

if there are a plurality of target other parameters among all of the other parameters, update the current parameter with any one of the plurality of target other parameters, until the target charging demand parameter is selected from the plurality of candidate parameters;

calculate the target charging scheme according to the target charging demand parameter and the actual operation state information.

In the embodiment of the present application, the charging demand parameter includes at least one of the following parameters:

a charging time at the user's disposal, mileage required by the user, a state of charge of the battery required by the user, a charging fee at the user's disposal, a type of charging mode, a charging price;

the target charging scheme includes at least one of the following considerations:

a charging waiting time for the user, increasable endurance mileage of the battery, an increasable SOC of the battery, a charging fee to be paid by the user.

In the embodiment of the present application, the actual operation state information of the battery includes: a current temperature of the battery, an SOC of the battery, and a capacity of the battery; and the actual operation state information of the battery further includes at least one of the following information:

an current SOH of the battery, a current voltage of the battery, an internal resistance of the battery, working information of a heating system of the battery, working information of a cooling system of the battery, mileage of the battery when fully charged.

In the embodiment of the present application, the battery also includes a determining module, which is configured to:

determine that the actual operation state information of the battery can be acquired.

In the embodiment of the present application, the determining module is specifically configured to:

determine that the current temperature of the battery is within a preset temperature range.

In the embodiment of the present application, the battery charging apparatus also includes a processing apparatus, which is configured to:

determine that the charge of the battery is completed according to the target charging scheme;

determine that the user is not in vehicle installed with the battery in located, and transmit, to the terminal of the user, selection information for instructing the user to select to re-develop a charging scheme or to stop transmitting a charging request to the charging device, so that the user gives a feedback instruction according to the selection information;

if the feedback instruction is received, re-develop a charging scheme or stop transmitting the charging request to the charging device.

In the embodiment of the present application, the processing apparatus is further configured to:

if the feedback instruction is not received, determine that the charging demand parameter includes a first charging fee at the user's disposal, and determine whether a second charging fee to be paid by user reaches the first charging fee;

if the second charging fee does not reach the first charging fee, transmit a second charging request to the charging device based on a charging planning scheme in a preset charging mode of the plurality of charging modes, so that the charging device charges the battery according to the second charging request; and if the second charging fee reaches the first charging fee, stop transmitting the second charging request to the charging device.

Other details of the battery charging device according to the embodiment of the present application are similar to the methods according to the embodiments of the present application described above in conjunction with FIG. 2, which will not be repeated here.

The present application also provides a battery management system, which includes the battery charging apparatus as shown in FIG. 3. Other details of the battery charging device included in the battery management system according to the embodiment of the present application are similar to the methods according to the embodiments of the present application described above in conjunction with FIG. 2, which will not be repeated here.

The embodiments of the present application also provide a charging pile, which includes the battery charging apparatus as shown in FIG. 3. Other details of the battery charging device included in the charging pile according to the embodiment of the present application are similar to the methods according to the embodiments of the present application described above in conjunction with FIG. 2, which will not be repeated here.

Figure 5:
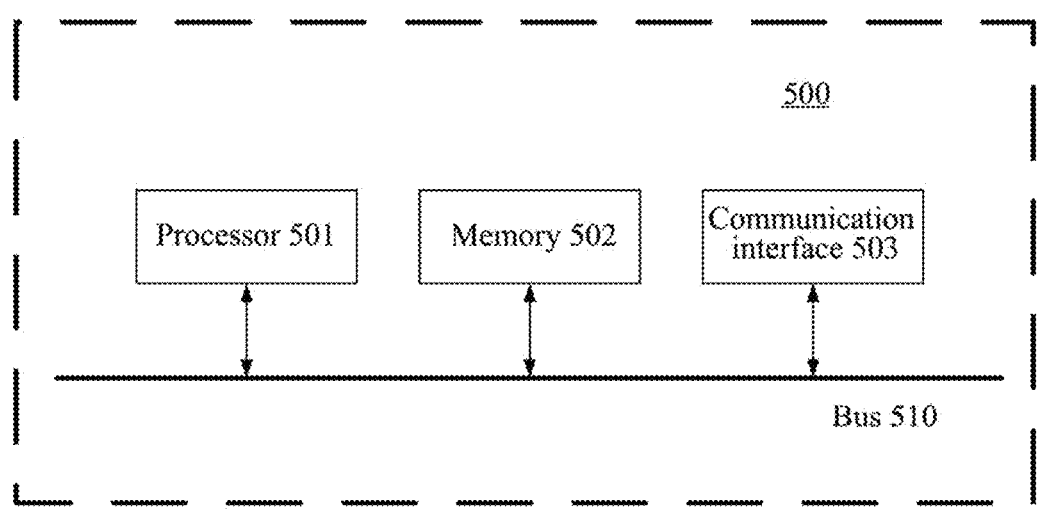
FIG. 5 shows a structural diagram of an exemplary hardware architecture of a battery charging device according to some embodiments of the present application.

The battery charging method and the apparatus described in conjunction with FIG. 2 to FIG. 4 according to the embodiments of the present application may be implemented through a battery charging device. FIG. 5 is a schematic diagram illustrating a hardware structure 500 of a battery charging device according to an embodiment of the present application.

As shown in FIG. 5, the battery charging device 500 in the embodiment includes: a processor 501, a memory 502, a communication interface 503, and a bus 510. The processor 501, the memory 502, and the communication interface 503 are connected to each other through the bus 510 and complete communication with each other.

Specifically, the above-mentioned processor 501 may include a central processing unit (CPU), or a specific integrated circuit (ASIC), or may be configured to implement one or more integrated circuits according to the embodiments of the present application.

The memory 502 may include a mass storage for data or instructions. By way of example instead of limitation, the memory 502 may include an HDD, a floppy disk drive, a flash memory, an optical disk, a magneto-optical disk, a magnetic tape or a universal serial bus (USB) drive, or a combination of two or more of these. Where appropriate, the memory 502 may include a removable or non-removable (or fixed) medium. Where appropriate, the memory 502 may be internal or external to the battery charging device 500. In a particular embodiment, the memory 502 is a non-volatile solid state memory. In a particular embodiment, the memory 502 includes a read-only memory (ROM). Where appropriate, the ROM may be a mask-programmed ROM, a programmable ROM (PROM), an erasable PROM (EPROM), an electrically erasable PROM (EEPROM), an electrically rewritable ROM (EAROM) or a flash memory, or a combination of two or more of these.

The communication interface 503 is mainly used to implement communication between various modules, devices, units, and/or devices in the embodiments of the present application.

The bus 510 includes hardware, software, or both, and couples components of the battery charging device 500 to each other. By way of example instead of limitation, the bus may include an accelerated graphics port (AGP) or other graphics buses, an enhanced industry standard architecture (EISA) bus, a front side bus (FSB), a hypertransport (HT) interconnect, an industry standard architecture (ISA) Bus, an unlimited bandwidth interconnect, a low pin count (LPC) bus, a memory bus, a microchannel architecture (MCA) bus, a peripheral component interconnect (PCI) bus, a PCI-Express (PCI-X) bus, a serial advanced technology An accessory (SATA) bus, a Video Electronics Standards Association local (VLB) bus, or other suitable bus, or a combination of two or more of these. Where appropriate, the bus 510 may include one or more buses. Although specific buses are described and illustrated in the embodiments of this application, this application contemplates any suitable bus or interconnect.

That is, the battery charging device 500 shown in FIG. 5 may be implemented to include: the processor 501, the memory 502, the communication interface 503, and the bus 510. The processor 501, the memory 502, and the communication interface 503 are connected through the bus 510 and complete communication with each other. The memory 502 is configured to store a program code; the processor 501 reads the executable program code stored in the memory 502 to run a program corresponding to the executable program code, to execute the battery charging method according to any one of the embodiments of the present application, thereby implementing the battery charging method and the device described in conjunction with FIG. 2 to FIG. 4.

The embodiments of the present application also provide a computer storage medium, where the computer storage medium has a computer program instruction stored thereon; where the computer program instruction, when being executed by a processor, implements the battery charging method as provided by the embodiments of the present application.

The functional block(s) shown in the block diagrams described above may be implemented in hardware, software, firmware, or a combination thereof. When implemented in hardware, the functional block(s) may be, for example, an electronic circuit, an application specific integrated circuit (ASIC), a suitable firmware, a plug-in, a function card or the like. When implemented in software, elements of the embodiments of the present disclosure are programs or code segments used to perform required tasks. The programs or code segments may be stored in a machine-readable medium or transmitted over a transmission medium or a communication link via data signals carried in carriers. The "machine-readable medium" may include any medium capable of storing or transmitting information. Examples of the machine-readable medium include an electronic circuit, a semiconductor memory device, a ROM, a flash memory, an erasable ROM (EROM), a floppy disk, a CD-ROM, an optical disk, a hard disk, a fiber medium, a radio frequency (RF) link, and the like. The code segments may be downloaded via a computer network, such as the Internet, an intranet, or the like.

Although the present application has been described with reference to the preferred embodiments, various modifications may be made thereto and components thereof may be replaced with equivalents without departing from the scope of the present application. In particular, as long as there is no structural conflict, the technical features mentioned in the embodiments can be combined in any manner. This application is not limited to the specific embodiments disclosed herein, instead, it includes all technical solutions that fall within the scope of the claims.

What is claimed is:

1. A battery charging method, comprising:
acquiring a charging demand parameter set by a user;
calculating, according to the charging demand parameter and acquired actual operation state information of a battery, a target charging scheme for charging the battery;
transmitting, according to the target charging scheme, a first charging request to a charging device, so that the charging device charges the battery according to the first charging request,
the calculating, according to the charging demand parameter and acquired actual operation state information of a battery, a target charging scheme for charging the battery comprises:
selecting, when the charging demand parameter comprises a plurality of candidate parameters associated with the charge capacity of the battery, any one candidate parameter of the plurality of candidate parameters as a current parameter;
calculating, according to the current parameter and the actual operation state information, a calculation value of each of other parameters under a condition of the current parameter, wherein the other parameters are parameters other than the current parameter of the plurality of candidate parameters;
taking the current parameter as a target charging demand parameter, when, for any other parameter of all the other parameters, the calculation value of the other parameter is less than or equal to a user input value corresponding to the other parameter;
taking, when there is only one target other parameter among all of the other parameters, the target other parameter as the target charging demand parameter, wherein a calculation value of the target other parameter is greater than a user input value corresponding to the target other parameter;
updating, when there are a plurality of target other parameters among all of the other parameters, the current parameter with any one of the plurality of target other parameters, until the target charging demand parameter is selected from the plurality of candidate parameters;
calculating the target charging scheme according to the target charging demand parameter and the actual operation state information.

2. The method according to claim 1, wherein, the calculating, according to the charging demand parameter and acquired actual operation state information of a battery, a target charging scheme for charging the battery comprises:
calculating, according to the charging demand parameter and the actual operation state information, a charging planning scheme in each charging mode of a plurality of preset charging modes respectively;
transmitting the charging planning scheme in each charging mode to a terminal of the user, so that the user selects a target charging mode from the plurality of charging modes according to the charging planning scheme in each charging mode;
taking a charging planning scheme in the target charging mode as the target charging scheme.

3. The method according to claim 1, wherein, the calculating, according to the charging demand parameter and acquired actual operation state information of a battery, a target charging scheme for charging the battery comprises:
acquiring a type of charging mode set by the user, and taking a charging mode of the set type as a target charging mode;
calculating, according to the charging demand parameter and the actual operation state information, a charging planning scheme in the target charging mode, and taking the charging planning scheme in the target charging mode as the target charging scheme.

4. The method according to claim 1, wherein, the calculating, according to the charging demand parameter and acquired actual operation state information of a battery, a target charging scheme for charging the battery comprises:
calculating, when the charging demand parameter does not comprise a charging demand parameter associated with a charge capacity of the battery, the target charging scheme according to a preset charging threshold and the actual operation state information;
calculating, when the charging demand parameter comprises only one charging demand parameter associated with the charge capacity of the battery, the target charging scheme according to the one charging demand parameter associated with the charge capacity and the actual operation state information.

5. The method according to claim 1, wherein, the charging demand parameter comprises at least one of the following parameters:
a charging time at the user's disposal, mileage required by the user, a state of charge of the battery required by the user, a charging fee at the user's disposal, a type of charging mode, a charging price;
the target charging scheme comprises at least one of the following considerations:

a charging waiting time for the user, increasable endurance mileage of the battery, an increasable SOC of the battery, a charging fee to be paid by the user.

6. The method according to claim 1, wherein, the actual operation state information of the battery comprises: a current temperature of the battery, a current state of charge SOC of the battery, and a capacity of the battery; and the actual operation state information of the battery further comprises at least one of the following information:

a current state of health SOH of the battery, a current voltage of the battery, an internal resistance of the battery, working information of a heating system of the battery, working information of a cooling system of the battery, mileage of the battery when fully charged.

7. The method according to claim 1, wherein, before the calculating, according to the charging demand parameter and acquired actual operation state information of a battery, a target charging scheme for charging the battery, the method comprises:

determining that the actual operation state information of the battery can be acquired.

8. The method according to claim 7, wherein, the actual operation state information comprises a current temperature of the battery, wherein, after the determining that the actual operation state information of the battery can be acquired and before the calculating, according to the charging demand parameter and acquired actual operation state information of a battery, a target charging scheme for charging the battery, the method further comprises:

determining that the current temperature of the battery is within a preset temperature range.

9. The method according to claim 2, wherein, the method further comprises:

determining that the charging of the battery is completed according to the target charging scheme;

determining that the user is not in a vehicle installed with the battery, and transmitting, to the terminal of the user, selection information for instructing the user to select to re-develop a charging scheme or to stop transmitting a charging request to the charging device, so that the user gives a feedback instruction according to the selection information;

re-developing a charging scheme or stopping transmitting a charging request to the charging device, when the feedback instruction is received.

10. The method according to claim 9, wherein, the method further comprises:

when the feedback instruction is not received, determining that the charging demand parameter comprises a first charging fee at the user's disposal, and determining whether a second charging fee to be paid by the user reaches the first charging fee;

transmitting a second charging request to the charging device according to a charging planning scheme in a preset charging mode of the plurality of charging modes, when the second charging fee does not reach the first charging fee, so that the charging device charges the battery according to the second charging request; and stopping transmitting the second charging request to the charging device, when the second charging fee reaches the first charging fee.

11. A battery charging apparatus, comprising: a processor and a memory having a computer program instruction stored thereon, wherein:

the processor is configured to execute the computer program instruction to:

acquire a charging demand parameter set by a user;

calculate, according to the charging demand parameter and acquired actual operation state information of a battery, a target charging scheme for charging the battery;

transmit, according to the target charging scheme, a first charging request to a charging device, so that the charging device charges the battery according to the first charging request, the processor is further configured to execute the computer program instruction to:

select, when the charging demand parameter comprises a plurality of candidate parameters associated with the charge capacity of the battery, any one candidate parameter of the plurality of candidate parameters as a current parameter;

calculate, according to the current parameter and the actual operation state information, a calculation value of each of other parameters under a condition of the current parameter, wherein the other parameters are parameters other than the current parameter of the plurality of candidate parameters;

take the current parameter as a target charging demand parameter, when, for any other parameter of all the other parameters, the calculation value of the other parameter is less than or equal to a user input value corresponding to the other parameter;

take, when there is only one target other parameter among all of the other parameters, the target other parameter as the target charging demand parameter, wherein a calculation value of the target other parameter is greater than a user input value corresponding to the target other parameter;

update, when there are a plurality of target other parameters among all of the other parameters, the current parameter with any one of the plurality of target other parameters, until the target charging demand parameter is selected from the plurality of candidate parameters;

calculate the target charging scheme according to the target charging demand parameter and the actual operation state information.

12. A battery management system, comprising the battery charging apparatus according to claim 11.

13. A charging pile, comprising the battery charging apparatus according to claim 11.

14. A computer storage medium having a computer program instruction stored thereon, wherein the computer program instruction, when being executed by a processor, implements the battery charging method according to claim 1.

15. The battery charging apparatus according to claim 11, wherein, the processor is further configured to execute the computer program instruction to:

calculate, according to the charging demand parameter and the actual operation state information, a charging planning scheme in each charging mode of a plurality of preset charging modes respectively;

transmit the charging planning scheme in each charging mode to a terminal of the user, so that the user selects a target charging mode from the plurality of charging modes according to the charging planning scheme in each charging mode;

take a charging planning scheme in the target charging mode as the target charging scheme.

16. The battery charging apparatus according to claim 11, wherein, the processor is further configured to execute the computer program instruction to:
  acquire a type of charging mode set by the user, and take a charging mode of the set type as a target charging mode;
  calculate, according to the charging demand parameter and the actual operation state information, a charging planning scheme in the target charging mode, and take the charging planning scheme in the target charging mode as the target charging scheme.

17. The battery charging apparatus according to claim 11, wherein, the processor is further configured to execute the computer program instruction to:
  calculate, when the charging demand parameter does not comprise a charging demand parameter associated with a charge capacity of the battery, the target charging scheme according to a preset charging threshold and the actual operation state information;
  calculate, when the charging demand parameter comprises only one charging demand parameter associated with the charge capacity of the battery, the target charging scheme according to the one charging demand parameter associated with the charge capacity and the actual operation state information.

18. The battery charging apparatus according to claim 11, wherein, the charging demand parameter comprises at least one of the following parameters:
  a charging time at the user's disposal, mileage required by the user, a state of charge of the battery required by the user, a charging fee at the user's disposal, a type of charging mode, a charging price;
  the target charging scheme comprises at least one of the following considerations:
  a charging waiting time for the user, increasable endurance mileage of the battery, an increasable SOC of the battery, a charging fee to be paid by the user.

* * * * *